Figure 1:
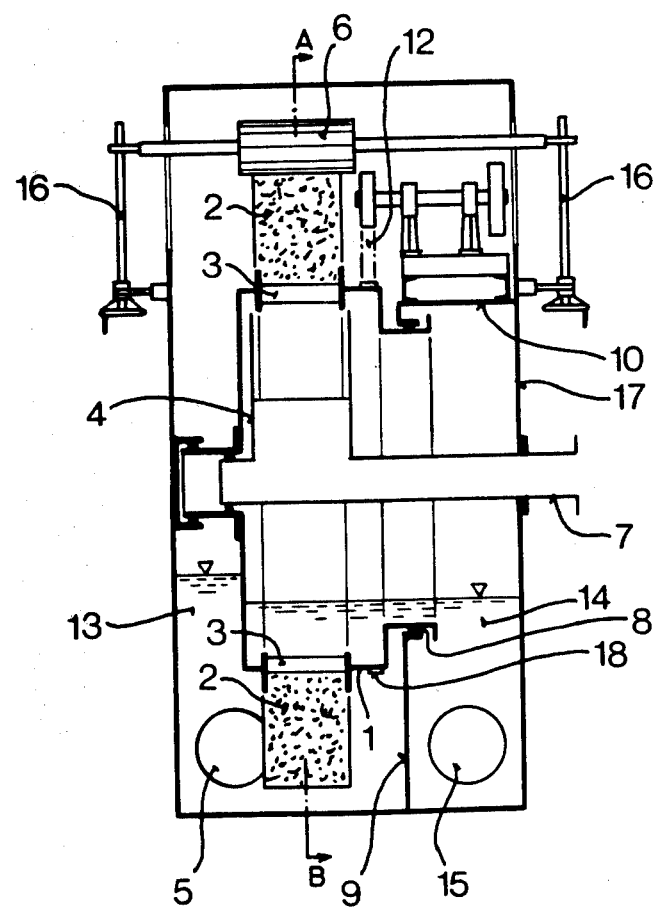

United States Patent [19]

Daucher et al.

[11] 4,212,737
[45] Jul. 15, 1980

[54] PROCESSES AND APPARATUS FOR REMOVING SUSPENDED MATTER FROM SUSPENSIONS BY FILTRATION THROUGH FOAMS

[75] Inventors: Hans Daucher, Ludwigshafen; Manfred Dressel, Lambsheim; Klaus Hess, Bad Durkheim; Hubert Engelhardt, Ludwigshafen, all of Fed. Rep. of Germany

[73] Assignee: BASF Aktiengesellschaft, Fed. Rep. of Germany

[21] Appl. No.: 883,720

[22] Filed: Mar. 6, 1978

[30] Foreign Application Priority Data

Mar. 22, 1977 [DE] Fed. Rep. of Germany ....... 2712414

[51] Int. Cl.² .......................................... B01D 33/10
[52] U.S. Cl. ..................................... 210/77; 210/79; 210/386; 210/402
[58] Field of Search ............... 210/730 W, 30 A, 153, 210/154, 242 AS, 24, 27, DIG. 26, DIG. 25, 350, 386, 502, 79, 77, 402

[56] References Cited

U.S. PATENT DOCUMENTS

| | | | |
|---|---|---|---|
| 2,860,973 | 11/1958 | Wells | 210/DIG. 26 |
| 3,487,927 | 1/1970 | Yahnke | 210/DIG. 26 |
| 3,992,292 | 11/1976 | Grimes et al. | 210/DIG. 26 |
| 4,065,389 | 12/1977 | McGrew | 210/DIG. 26 |

Primary Examiner—Frank Sever
Attorney, Agent, or Firm—Keil & Witherspoon

[57] ABSTRACT

A process and apparatus for removing suspended matter from suspensions by filtering through foams, in which the suspended matter retained in the foam (polyurethane foam produced by foaming with water vapor being preferred) is substantially flushed out by expressing the liquid held in the foam, and is removed as a concentrate. This for the the first time permits the removal of suspended matter from continuously flowing suspensions without the flow of the suspensions having to be interrupted in order to clean the filtering means.

2 Claims, 4 Drawing Figures

PROCESSES AND APPARATUS FOR REMOVING SUSPENDED MATTER FROM SUSPENSIONS BY FILTRATION THROUGH FOAMS

The present invention relates to processes and apparatus for removing suspended matter from suspensions, e.g. from water, effluent and/or other liquids, by filtration through foams.

The removal of suspended matter is important since such matter lowers the quality of water or of liquids generally and, for example, if present in the final effluent from a sewage treatment works, leads to increased contamination of the receiving water body.

Such suspended matter is in the form of particles ranging in size from 1 μm to several mm and is present in concentrations of from a few mg/l to several g/l or, in the case of a sample which has been allowed to settle for two hours, from about 0.1 to several hundred mg/l.

The use of sand filtration, micro-screening and/or foam filtration for the removal of suspended matter from water, effluent and other liquids has been disclosed. In sand filtration, the liquid to be treated is forced through layers of sand. The filtering action results from the fact that the individual sand particles do not rest tightly packed against one another, but that instead there are voids between them, the size of which depends on the particle size of the sand. Sand filters are composed of several layers of sand or other granular material of different particle size. The sand layer through which—viewed in the filtering direction—the liquid first flows, has the coarsest particle size and hence the largest voids. The subsequent sand layers consist of progressively finer sand and hence have progressively smaller voids. The filtering action is due to the fact that somewhere in the various layers of sand, at least one of the geometrical dimensions of the suspended matter to be removed is greater than the size of the voids between the sand particles, i.e. bulky suspended matter is retained in the sand layer of coarse particle size, and finer suspended matter in the layers of fine particle size. The particle size of the sand can virtually be chosen as small as may be desired, a limit being imposed by high pressure losses in the narrow voids leading to uneconomical operation.

In micro-screening, the liquid is passed through fabrics of plastic or metal filaments which are crossed and knotted or welded to one another. The filtering action depends on the mesh size, i.e. the spacing of the individual filaments, the dimensions of the suspended matter and the accumulation of suspended matter on the micro-screen surface. The suspension to be separated encounters one side of the micro-screens, and the relatively coarse suspended matter is retained on the fabric and partially blocks the free passages between the individual filaments of the fabric. Accordingly, the effective size of the meshes becomes progressively smaller the longer the screen fabric is charged with the suspension to be separated, since the passages between the fabric filaments which have been partially blocked by coarse suspended matter are in turn blocked completely or partially by other suspended matter; accordingly, with increasing filtering time, progressively finer suspended matter is removed from the suspension, until ultimately all the passages have been blocked. After cleaning the concentrated suspended matter off the screen fabric, the above filtering operation can be repeated.

In the case of foam filtration, the extensively inter-linked structure of the foam is utilized. This structure results from the fact that various low molecular weight, low viscosity components, homogeneously mixed with additives and blowing gas, react with one another, and foam up, in the absence of any turbulence. Interconnected skins form round the enclosed gas bubbles, and on further foaming these skins burst and allow the gas to escape. Curing must be controlled so that the gas is able to escape before the material has cured, in order to produce an open-cell foam structure, i.e. a structure without trapped gas bubbles which would block the flow through the foam. The structure of the foam is formed by the residual connecting webs between the individual bubbles. The suspension to be separated is passed through this labyrinth of webs, which are at various distances from one another, and the suspended matter, because of its geometrical shape, becomes trapped in the foam structure, partially blocks the free passages and hence, due to the resulting smaller passages, permits the removal of even finer suspended matter, until the foam is completely blocked. After a cleaning stage, the foam is again capable of taking up suspended matter and the filtering step can be repeated.

In a conventional device, a perforated tube which is completely enclosed by foam and dips into the suspension is used; this tube serves to stabilize the foam mechanically and permits the purified liquids to drain off. The filtering step takes place as described above, i.e. the suspension to be separated penetrates through the foam, the suspended matter being retained in the cell structure. When the foam has become laden with suspended matter, i.e. when its purifying action becomes inadequate or the pressure drop becomes excessive, the foam must be cleaned in a discontinuous operation, by expressing it and brushing off the suspended matter.

In micro-screen filtering devices, plastic or metal fabrics, or perforated plastic or metal sheets, are mounted on metal, wooden or plastic frames or drums. The drum, with the screen mounted on its cylindrical surface, dips partially into the treated liquid, whilst its inner surface is charged with the suspension to be separated. The treated liquid drains outward in the filtration zone, i.e. the zone of the filter fabric which spatially separates the liquid to be treated from the liquid which has been treated, whilst the suspended matter is retained on the inner surface of the fabric. To avoid clogging the fabric, the drum rotates and is continuously sprayed externally with treated liquid or with water in a cleaning zone, so that the concentrated suspended matter adhering to the inside of the fabric can be flushed off, collected in a trough and discharged separately.

In the case of sand filters, the suspension to be separated is passed through the sand layers described above. These layers are contained in tubes or columns of various shapes, which are able to contain a plurality of sand layers over a relatively small surface area. When the filtering action declines or the pressure loss becomes excessive, the sand charge must be flushed in the opposite direction to the filtering direction. This lifts the individual sand particles from one another and the trapped or deposited suspended matter can flow away from the flushing water. In this flushng step, the sand layers become rearranged, since the fine sand particles are entrained furthest in the flushing direction. Accordingly, after having carried out the filtration in a downward direction, the coarse sand layer would, after flushing, be at the bottom and the finest sand layer at the top.

This effect can in part be prevented by using materials of different density (e.g. anthracite and sand) for making up the filter layers. The coarser layer is made of the less dense material whilst the particles of the finest layer have the greatest density. It is true that if filtration is carried out in an upward direction, there is no rearrangement of the layers since the coarse layer is at the bottom. However, overall the handling of such a system is more difficult, since, even if filtration is merely carried out at too high a flow rate or if the filter layers are substantially laden with suspended matter, the sand particles are lifted from one another and suspended matter is entrained and contaminates the final effluent, unless a device for holding down the sand bed is provided.

Because of their composition, sand filters provide efficient purification coupled with relatively low investment costs and low costs of filter material. Their disadvantages are the relatively high operating pressures, occasioned by the high pressure loss in the bed, and hence high energy consumption. Furthermore, they require much space and the extent to which they can be regulated is unsatisfactory, since it is only the throughput, the filter volume and the packing density, i.e. the particle size of the filter material, which can be varied. All these measures entail substantial expense and in practice adjustments are limited. For example, in most cases a fixed volume of suspension per unit time awaits treatment, and therefore the throughput cannot be used as a parameter for controlling the system. Changing the filter volume is only possible if relatively high investment is acceptable, and changing the particle size of the filter material entails substantial refitting work, since a fresh bed has to be prepared. This interruption in the filtering operation also has to be accepted when cleaning the filter, since, as described above, such cleaning is carried out discontinuously except where special designs are used. A further disadvantage is the relatively long residence time, in the sand layers, of the concentrated suspended matter. Since the water to be filtered is not oxygen-free and still contains some residual contaminant, micro-organisms can colonize on the sand particles and in the voids, and can cause the sand filter to become blocked more rapidly, as well as creating an odor nuisance.

It is true that lower operating pressures can be used with micro-screen filtration, since the loss of pressure occasioned by the fabric is low and the losses of pressure occasioned by the suspended matter deposited on the fabric surface can be kept low, since it is possible to speed up the cleaning-off, by increasing the speed of rotation of the drum or increasing the amount of water sprayed on to the drum to clean it, and hence possible to reduce the pressure losses. As result of the combination of continuous filtration and continuous cleaning off, the residence time of the filtered-off suspended matter is also low, and because of the low pressure losses the energy consumption is low. Furthermore, the filter surface is exposed uniformly and the space requirement is less than that of a sand filter. However, it is a disadvantage that the equipment comprises moving parts, e.g. bearings, which, in the event of unsuitable selection of material of inadequate maintenance, can swell and therefore seize up. Plastic fabrics are relatively expensive whilst the expense of metal fabrics is substantially higher still. Plastic fabrics are very sensitive to mechanical stresses and clog if the concentration of susended matter in the suspension is too high, as do metal fabrics.

Furthermore, cleaning the fabric by spraying is not very effective, since, in accordance with the particle size of the suspended matter in the suspension, fine mesh widths must be used if the purifying effect is to be good. Such fine fabrics have an unfavorable ratio of total fabric surface to free filter surface area, i.e. to the proportion of fabric consisting of free passages. When the laden fabric is sprayed with treated water in the direction opposite to the filtering direction, the greater part of the water bounces off the fabric surface and only a small proportion actually penetrates the fabric and detaches the concentrated suspended matter. If the pressure of the spraying water is increased in order to improve the purification effect, there is the danger that suspended matter still present in the treated water will strike the fabric surface in the manner of small projectiles, be forced in between the fabric filaments, and externally block the free filter surface. This results in relatively high operating pressures, the need to use large amounts of spraying water compared to the throughput of the filtration, and a greatly reduced working life of the fabric or even irreparable damage thereto.

By contrast, a foam filter is insensitive to impact, since the suspended matter is not merely accumulated on the surface, as in the case of micro-screen filtration, but instead filtration takes place predominantly in the actual foam. The purifying efficiency is similar to that of a sand filter, but the energy consumption is less since the pressure loss occasioned by the foam is substantially less than that occasioned by a sand bed. Disadvantages are, as in the case of a sand filter, that cleaning off is carried out discontinuously and hence there are fluctuations in throughput if the filter is operated at constant pressure, or alternatively the pressure rises if the filter is operated at constant throughput. In addition, on expressing the foam in the system, suspended matter enters the treated water, since, though the foam spatially separates the suspension from the treated water, there is no defined expressing zone in which the suspended matter which has become concentrated in the foam could be expressed without re-contaminating the treated water. Hitherto, effective treatment has only been possible if the foam is periodically taken out of the suspension and is cleaned outside the system.

It is an object of the present invention to provide a process whereby suspended matter can be removed from continuously flowing suspensions by filtering through foam, without having to interrupt the continuous flow of the suspensions in order to regenerate the foam which has become laden with suspended matter.

We have found that this object is achieved, according to the invention, if the foam, which spatially separates the suspension and the filtrate from one another in a filtration zone through which said foam is mechanically conveyed along, encounters the suspension in the filtration zone, the suspended matter of the suspension being retained on and in the foam, and the foam conveyed out of the filtration zone is cleaned by expressing the liquid held in the foam, the suspended matter deposited on and in the foam is substantially flushed out and removed as a concentrate, and the cleaned foam is again conveyed into the filtration zone.

Alternatively, the above object is achieved, according to the invention, if the foam, which spatially separates the flowing suspension from the filtrate, is expressed at recurring intervals, counter to the direction of flow of the suspension, so as to free it from the suspended matter deposited on and in the foam, by displacing the said suspended matter from all parts of the foam, and this suspended matter is successively flushed back into the suspension and, after settling, is taken off as a concentrate.

In a further embodiment of the process according to the invention, it is advantageous to lift off, and remove, suspended matter resting on the foam, before expressing the latter.

The advantage achievable by the processes according to the invention is that, using a cheap filtration medium, under low operating pressures and hence with low operating costs, a very good purification effect is achieved without having to interrupt the continuous flow of the suspension to be treated and without having to pump liquid in the way that is necessary for back-washing the filter in the case of micro-screen filtration.

The present invention further relates to apparatus for carrying out the process according to the invention. The object of these apparatus is so to treat the foam used for filtration that suspended matter can be removed from continuously flowing suspensions without the said continuous flow having to be interrupted when regeneration of the foam, laden with suspended matter, becomes necessary.

According to the invention, this object is achieved by an apparatus wherein a drum which is covered on its outer cylindrical surface with foam, preferably with a polyurethane foam which has been produced by foaming with water vapor, the drum being horizontal, rotatable about its axis, permeable to liquids in a radial direction and closed at one of its end faces, dips partially into the suspension, a roller which is adjustable radially to the drum is located above the drum for expressing the foam laden with suspended matter, a trough is provided inside the drum to collect the expressed concentrate of suspended matter, and a line for removing the concentrate from the trough passes through the open side of the drum, and the suspension is kept separate from the treated liquid by means of partitions making a watertight fit with the open side of the drum.

Alternatively, the above object is achieved, according to the invention, if the foam, preferably a polyurethane foam which has been produced by foaming with water vapor, is mounted in front of the overflow partition of a settling basin so that the continuously issuing water, before leaving the settling basin, has to penetrate the foam, the suspended matter contained in the water being retained on and in the foam and being flushed back into the settling basin as the water held in the foam is expressed by a moving expressing means.

In a further embodiment of the apparatus according to the invention, it is advantageous to employ superposed layers of foams of different pore sizes.

The advantages achievable by means of the apparatus according to the invention are that, in contrast to sand filters, suspensions can be separated continuously, with low energy consumption and low investment costs, and in an easily operated manner and with little maintenance being required, and that in contrast to micro-screening equipment, no separate device for flushing off the suspended matter deposited on the filter fabric needs to be provided since, due to the water absorption capacity of the foam, cleaning the latter by displacing this held water by means of a simple expressing device suffices to flush the deposited or embedded suspended matter entirely or partially out of the foam. Furthermore the apparatus according to the invention makes it possible, in contrast to conventional apparatus, to remove suspended matter from continuously flowing suspensions directly in existing settling or clarifying basins, by filtration through foam, without having to interrupt the flow of the suspensions in order to clean the foam, by continuously flushing the liquid held in the foam, and hence the suspended matter embedded in and deposited on the foam, out of the latter and allowing it to settle in the tank because of the improved settling behavior so that in this way the suspended matter undergoes a further static concentration process and can be discharged in a concentrated form.

Figure 2:
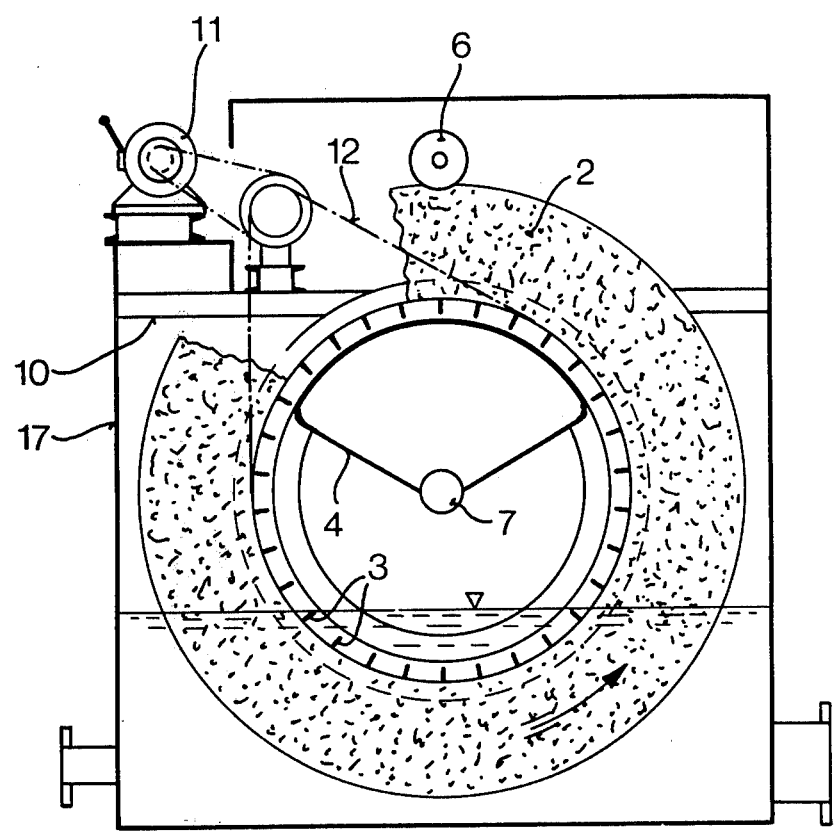
Figure 3:
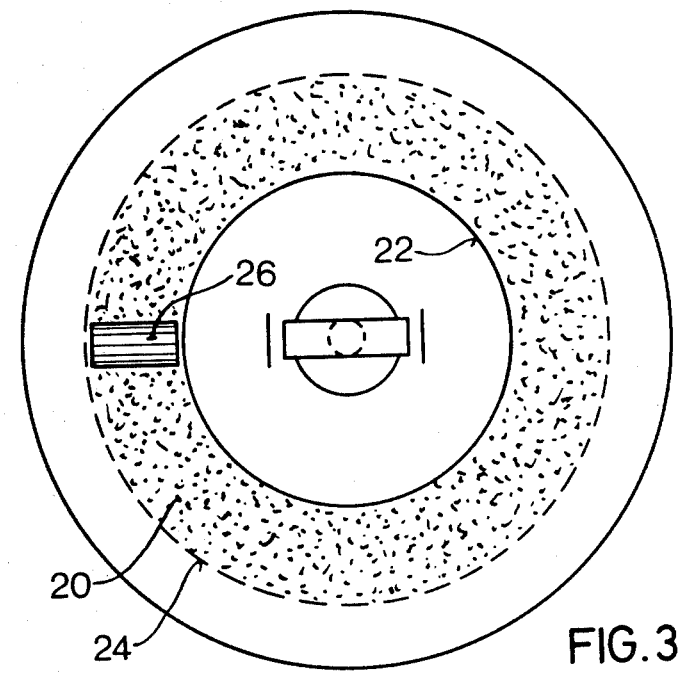
Figure 4:
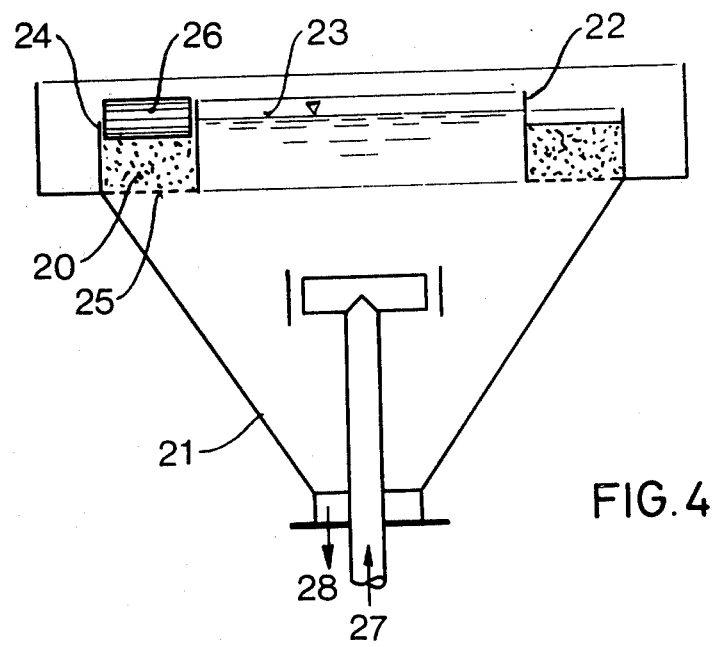

FIG. 1 shows a first embodiment of the invention.
FIG. 2 shows a side view of FIG. 1.
FIG. 3 shows a second embodiment of the invention.
FIG. 4 shows an elevation view of FIG. 3.

FIGS. 1 and 2 show an embodiment of an apparatus for carrying out the process according to the invention, two cross-sections at right angles to one another being depicted. The essential member of this apparatus consists of a rotatable drum 1 which receives a foam 2 so that the latter can be conveyed without slippage. The supporting surface of the drum 1 consists of separate bars 3, which leave a free passage for the treated water, prevent slippage of the foam 2 and serve as drip-off edges for the expressed water obtained on cleaning the foam 2, so that the suspended matter flushed out with the water held in the foam and then expressed therefrom can drain in a defined manner into a collecting trough 4.

The suspension to be separated is passed through an orifice 5 into a feed chamber 13 and after filtration through the foam 2 passes into a second chamber 14, from where the treated water is taken off through an orifice 15, or runs off by gravity.

The laden foam 2 is cleaned by means of an expressing roller 6, the contact pressure of which can be regulated by means of two spindles 16. These also serve to adjust the roller to conform to different thicknesses of foam.

The suspended matter flushed out of the foam 2 in an inward direction is collected in the collecting trough 4 and is then removed through a pipe 7 in such a way as to avoid contaminating the treated water. The water which runs off the outside of the foam 2 directly returns to the feed chamber 13. The feed chamber 13 containing the suspension is separated from the chamber 14 containing the treated water by means of a seal 8 and a partition 9 and, in the filtration zone itself, by means of the foam 2.

In order that the expressed water, containing an increased concentration of suspended matter and running off the outside of the foam 2, shall not be able to enter the chamber 14, containing the treated water, this latter chamber is sealed off by a plate 10 which covers the chamber 14 all the way up to the walls 17 of the housing.

The drum 1 is driven by means of a variable-speed motor 11 and a toothed belt 12, by means of which the rotary motion is transmitted to the drum 1. Slippage of the toothed belt 12 on the drum 1 is prevented by a few glued-on and screwed-on strips 18.

In a second apparatus shown in plan view in FIG. 3 and in vertical section in FIG. 4, a foam 20 is fitted directly into a settling and clarifying basin 21. The foam 20 is introduced between an immersed partition 22, which retains matter floating on the surface 23 of the liquid, and an overflow partition 24 for the treated liquid. The foam 20 rests on a stable grid 25, to which it is fixed, and which furthermore prevents the foam 20 from sagging during expression.

The foam 20 must rest tightly against its lateral guide walls 22 and 24 to prevent the as yet untreated suspension from draining off directly. In order to drain off, the suspension which is supplied through a pipe 27 and rises in the settling basin 21 must flow through the foam 20, so that the suspended matter is retained thereon and therein.

The regeneration of the foam 20 takes place simultaneously with the filtration step, and is effected by an expressing means 26 which is moved over the foam 20 and which flushes the suspended matter deposited on, and embedded in, the foam 20, together with the liquid held in the foam, back into the suspension, where the expressed suspended matter settles and can then be drawn off as a concentrate through an orifice 28.

The speed of movement of the expressing means 26 depends on the degree to which the foam 20 is laden with suspended matter, and on the degree of purification.

If the foam is excessively laden with suspended matter, i.e. if the operating pressure is too high and the degree of purification is poor, the speed or pressure of the expressing means 26 is increased, whilst if the operating pressure is too low and the degree of purification is poor, the speed and pressure of the expressing means are reduced in order to achieve a greater degree of loading of the foam, thereby reducing its effective pore size.

The processes and apparatus according to the invention may be used in conjunction with overloaded final settling basins of communal and industrial sewage treatment works, and in connection with the production of drinking water.

We claim:

1. A continuous process for removing suspended solid particulate matter from at least partially aqueous liquid suspensions by filtering through a resilient foam of polyurethane blown with water vapor, without interrupting the continuous flow of said suspensions by regenerating the particle-laden foam, comprising:

(a) disposing the foam in a filtration zone so as to separate spatially the suspension and the filtrate afterwards produced;
   (b) conveying the foam mechanically through the filtration zone to encounter the suspension moving therethrough, thereby entrapping the suspended solid particulate matter on and in said foam and absorbing substantially only said at least partially aqueous liquid into said foam;
   (c) conveying the suspension-laden foam out of the filtration zone;
   (d) cleaning the surface of the laden foam by lifting off and removing the suspended matter resting on the foam;
   (e) then expressing the aqueous liquid held in said laden foam, the suspended matter deposited in the foam being substantially flushed out and removed as a concentrate; and
   (f) conveying the cleaned and expressed foam back into the filtration zone.

2. Apparatus for continuously removing suspended particulate matter from at least partially aqueous liquid suspensions by filtering through a resilient foam of polyurethane blown with water vapor, without interrupting the continuous flow of said suspensions by regenerating the particle-laden foam, comprising:

means for absorbing substantially only said at least partially aqueous liquid and entrapping said particulate matter, including a rotatably mounted drum, which is covered on its outer cylindrical surface with superposed layers of said foam of polyurethane blown with water vapor, said layers having different pore widths, so as to be permeable to at least partially aqueous suspensions in a radial direction, which drum is closed at one of its faces and which has its axis of rotation horizontally disposed so as to dip partially into said suspension flowing through said apparatus during operation;

a roller, which is adjustable radially to the drum, disposed above the drum for expressing the foam when laden with suspended matter and liquid during operation of the apparatus;

a trough located inside the drum to collect the expressed concentrate of suspended matter produced by the action of said roller;

a line connected with said trough for removing said concentrate from the trough and passing through the open face of the drum; and partitions providing means to keep the suspension separate from the purified liquid and which make a water-tight fit with the open face of the drum.

* * * * *